(12) United States Patent
Bogdan

(10) Patent No.: US 7,665,903 B2
(45) Date of Patent: Feb. 23, 2010

(54) OPTICAL RECEPTACLE HAVING AN ELECTRICALLY ISOLATING RING FOR ELECTRICALLY ISOLATING THE SIGNAL GROUND AND THE CHASSIS GROUND IN AN OPTICAL TRANSCEIVER MODULE

(75) Inventor: Guja Victor Bogdan, Canavese (IT)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 154 days.

(21) Appl. No.: 11/866,536

(22) Filed: Oct. 3, 2007

(65) Prior Publication Data

US 2009/0092361 A1 Apr. 9, 2009

(51) Int. Cl.
*G02B 6/36* (2006.01)

(52) U.S. Cl. ............................ 385/88; 385/92; 385/76; 385/78; 385/139; 398/135; 398/136; 398/137; 398/138; 398/139

(58) Field of Classification Search .................... 385/88
See application file for complete search history.

(56) References Cited

U.S. PATENT DOCUMENTS

| | | | | |
|---|---|---|---|---|
| 5,895,240 A * | 4/1999 | Chuang et al. | ............... | 438/260 |
| 6,108,478 A * | 8/2000 | Harpin et al. | ............... | 385/129 |
| 6,206,582 B1 | 3/2001 | Gilliland | | |
| 6,293,710 B1 | 9/2001 | Lampert et al. | | |
| 6,316,281 B1 * | 11/2001 | Lee et al. | ....................... | 438/31 |
| 6,540,412 B2 | 4/2003 | Yonemura et al. | | |
| 6,628,852 B2 * | 9/2003 | House et al. | ................... | 385/14 |
| 6,796,719 B2 | 9/2004 | Zhu et al. | | |
| 6,870,238 B2 | 3/2005 | Exposito et al. | | |
| 6,874,953 B2 | 4/2005 | Dair et al. | | |
| 7,213,980 B2 * | 5/2007 | Oki et al. | ....................... | 385/92 |
| 7,261,473 B2 | 8/2007 | Owen et al. | | |
| 2005/0058406 A1 * | 3/2005 | Reilly et al. | ................... | 385/88 |
| 2005/0286838 A1 * | 12/2005 | Oki et al. | ....................... | 385/92 |
| 2007/0274643 A1 | 11/2007 | Okada | | |
| 2008/0031634 A1 | 2/2008 | Nguyen et al. | | |
| 2009/0175582 A1 | 7/2009 | Togami et al. | | |

* cited by examiner

*Primary Examiner*—Frank G Font
*Assistant Examiner*—Mary A El Shammaa

(57) ABSTRACT

A receptacle is provided that is suitable for use in smaller and larger format transceivers and that eliminates problems associated with electrically isolating the signal ground and chassis ground from each other. The receptacle is identical in shape to the receptacle currently used in the transceiver module, but the portion of the receptacle that comes into physical contact with metallic housing of the transceiver module is made of an electrically insulating material rather than metal so that no electrical current passes between the metallic portions of the receptacle and the metallic transceiver module housing. Thus, the signal ground of the TO header on which the transmitter or receiver package is based is electrically isolated from the chassis ground attached to the housing of the transceiver module. Because the shape of the receptacle is not altered from its current shape, the assembly process for assembling the transceiver module is not further complicated.

15 Claims, 5 Drawing Sheets

US 7,665,903 B2

OPTICAL RECEPTACLE HAVING AN ELECTRICALLY ISOLATING RING FOR ELECTRICALLY ISOLATING THE SIGNAL GROUND AND THE CHASSIS GROUND IN AN OPTICAL TRANSCEIVER MODULE

TECHNICAL FIELD OF THE INVENTION

The invention relates to receptacles used in optical transceiver modules. More particularly, the invention relates to a receptacle of an optical transceiver module that has an electrically isolating ring that isolates the electrical signal ground from the electrical chassis ground.

BACKGROUND OF THE INVENTION

FIG. 1 illustrates a perspective view of a known optical transceiver module 2 that has a format known as a small transceiver format. Some examples of known small transceiver formats are the XFP, SFP and SFP+ formats. The transceiver module 2 shown in FIG. 1 is an SFP format transceiver module. The transceiver module 2 includes a metallic module housing made up of an upper metallic housing portion 13 and a lower metallic housing portion 14 that together house a receptacle 5 and a plug 8. The plug 8 receives an optical fiber cable 9 that has a boot 11 attached to an end thereof. The boot 11 includes a ferrule 12 the holds the end of an optical fiber (not shown) of cable 9. A latch 15 of the plug 8 latches the plug 8 to the receptacle 5 to maintain the plug 8 and the receptacle 5 in locking engagement with each other. Features on the upper and lower housing portions 13 and 14 interlock with features on the receptacle 5 to maintain the receptacle 5 in locking engagement with the housing portions 13 and 13.

When the plug 8 is connected with the receptacle 5, the ferrule 12 is contained within the receptacle 5. The receptacle 5 is assembled together with a transmitter package 16 of the transceiver module 2 and the package 16 is fixedly secured to the receptacle 5 opposite the end of the receptacle 5 to which the plug 8 is connected. This is typically referred to as a transistor outline (TO)-can configuration. The transceiver module 2 typically also includes a receiver package (not shown) assembled together with an identical receptacle (not shown) and located inside of the housing portions 13 and 14 beside the transmitter package 16. The transmitter package 16 typically contains a laser diode chip, one or more lenses that make up an optics system, and one or more other electrical components that are all mounted on a submount assembly.

When the plug 8 and transmitter package 16 are secured to the receptacle 5, the end of the optical fiber contained in the ferrule 12 is optically aligned with the optics system (not shown) of the transmitter package 16. Electrical leads 18, 19, 21 and 22 pass through the TO header 17 and communicate electrical signals between traces on the transmitter submount assembly and electrical circuitry (not shown) in the transceiver module 2 that is external to the transmitter package 16. An electrical signal ground 23 on the TO header 17 is used as the signal ground for the electrical components of the transmitter package 16. Other electrical components of the transceiver module 2 that are external to the transmitter package 16 are electrically grounded by connecting their ground contacts (not shown) together and to the signal ground 23 and all together to the upper or lower metallic housing portions 13 and 14, through the metallic receptacle 5. This metallic housing electrical ground connection is referred to as the chassis ground.

In some applications, in order for the transceiver module 2 to operate properly, the signal ground 23 and the chassis ground (not shown) must be electrically isolated from each other. The receptacle 5 is normally made of metal and is in direct contact with the housing portions 13 and 14, which are at the chassis ground potential. Isolating these grounds presents certain challenges that must be addressed, as will be described below with reference to FIG. 3.

FIG. 2 illustrates a perspective view of the receptacle 5 of the transceiver module 2 shown in FIG. 1. The receptacle 5 has a first cylindrical portion 25 shaped to mate with the plug 8 and a second cylindrical portion 27 shaped to mate with the transmitter package 16. Between the first and second cylindrical portions 25 and 27 is a ring defined by a flat cylindrical portion 26A and flanges 26B and 26C. The ring is the part of the receptacle 5 that mechanically mates with mating features of the housing portions 13 and 14. The shape of the ring and its attachment to the housing portions 13 and 14 ensures mechanical and optical alignment of the fiber end contained in the ferrule 12 with the optics system of the transmitter package 16. Because the body of the receptacle 5 is made of metal, the receptacle 5 provides electromagnetic shielding, which is desirable. However, because the body of the ring 26A-26C of the receptacle 5 is normally in physical contact with the upper and/or lower housing portions 13 and 14, electrically isolating the signal ground 23 from the chassis ground, as required by some applications, presents difficulties.

One solution for electrically isolating the receptacle 5 from the housing portions 13 and 14 is to attach the receptacle 5 to the TO header 17 having the transmitter package 16 mounted thereto using some type of isolating resin. Although resins exist that are stable and mechanically resistant, using such a resin during the assembly process tends to be "dirty" because of the possibility that the resin might adhere to optical surfaces of the transmitter package 16. This makes the assembly process more difficult to perform. In addition, the process of attaching the receptacle 5 to the TO header 17 using resin is more difficult to successfully repeat than the laser welding process often used to attach the receptacle 5 to the TO header 17.

Another solution to this problem is to include an isolating cage that surrounds the receptacle and isolates it from the housing. FIG. 3 illustrates a perspective view of a transceiver module 32 having a plastic cage 33 made up of an upper cage portion 33A and a lower cage portion 33B. The cage 33 surrounds the receptacle 35 and prevents the receptacle 35 from coming into contact with the upper and lower metallic housing portions 36 and 37, thereby electrically isolating the signal ground 38 from the chassis ground 39. The transceiver module 32 shown in FIG. 3 is larger than the transceiver module 2 shown in FIG. 1 and is known as an X2 format transceiver module.

Although the plastic cage 33 provides the needed electrical isolation between the signal ground 38 and the chassis ground 39, which is shown for illustrative purposes as being at a location on the lower housing portion 37, the plastic cage 33 is relatively expensive and further complicates the assembly process. More importantly, the cage 33 requires a lot of space in the transceiver module 32. Such a plastic cage generally cannot be used in small format transceiver modules of the type shown in FIG. 1 because there is not enough available space in those types of modules.

Accordingly, a need exists for a way to electrically isolate the signal ground from the chassis ground that is suitable for use in smaller and larger format transceiver modules, which is relatively inexpensive to implement, and which does not further complicate the assembly process.

SUMMARY OF THE INVENTION

The invention is directed to a receptacle for use in an optical transceiver module that eliminates problems associated with electrically isolating the signal ground and the chassis ground. The receptacle comprises a first portion adapted to receive an end of an optical plug, a second portion adapted to mechanically couple with a transmitter or receiver package, and a third portion adapted to mechanically couple with a housing of the transceiver module. The third portion comprises an electrically insulating material such that coupling the third portion to the transceiver module housing electrically isolates the signal ground, which is connected to the receptacle, from the chassis ground, which is connected to the transceiver module housing.

The invention also is directed to a transceiver module in which the receptacle is used. The transceiver module comprises a receptacle, and optical plug and a transceiver package. The receptacle comprises a first portion adapted to receive an end of an optical plug, a second portion adapted to mechanically couple with a transmitter or receiver package, and a third portion adapted to mechanically couple with a housing of the transceiver module. The third portion comprises an electrically insulating material. The optical plug is secured to the first portion of the receptacle. The transmitter or receiver package is secured to the second portion of the receptacle.

The invention is also directed to a method for electrically isolating a signal ground from a chassis ground in an optical transceiver module. The method comprises providing a receptacle comprising a first portion adapted to receive an end of an optical plug, a second portion adapted to mechanically couple with a transmitter or receiver package, and a third portion adapted to mechanically couple with a housing of the transceiver module. The third portion comprises an electrically insulating material. The third portion of the receptacle is coupled to a housing of the optical transceiver module. An optical plug is secured to the first portion of the receptacle. A transmitter or receiver package is secured to the second portion of the receptacle.

These and other features and advantages of the invention will become apparent from the following description, drawings and claims.

DETAILED DESCRIPTION OF AN ILLUSTRATIVE EMBODIMENT

In accordance with various embodiments that will be described herein, a receptacle is provided that is suitable for use in smaller and larger format transceivers. In accordance with an embodiment, the receptacle is identical in shape to the receptacle currently used in the transceiver module, but the portion of the receptacle that comes into physical contact with the metallic housing of the transceiver module is made of an electrically insulating material rather than metal so that no electrical current passes between the metallic portions of the receptacle and the housing. Thus, the signal ground of the TO header on which the transmitter or receiver package is mounted is electrically isolated from the chassis ground attached to the housing of the transceiver module. Because the shape of the receptacle is not altered from its current shape, the assembly process for assembling the transceiver module is not further complicated. In addition, because only the thin portion of the receptacle that attaches to the transceiver module housing is made of electrically insulating material, the other metallic portions of the receptacle still provide electromagnetic shielding.

Figure 4A:
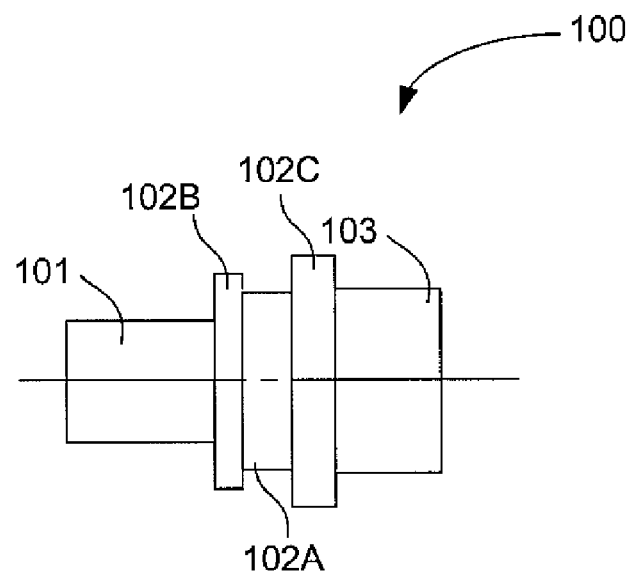
FIGS. 4A and 4B illustrate a side plan view and a side cross-sectional view, respectively, of the receptacle of the invention in accordance with one illustrative embodiment.
Figure 4B:
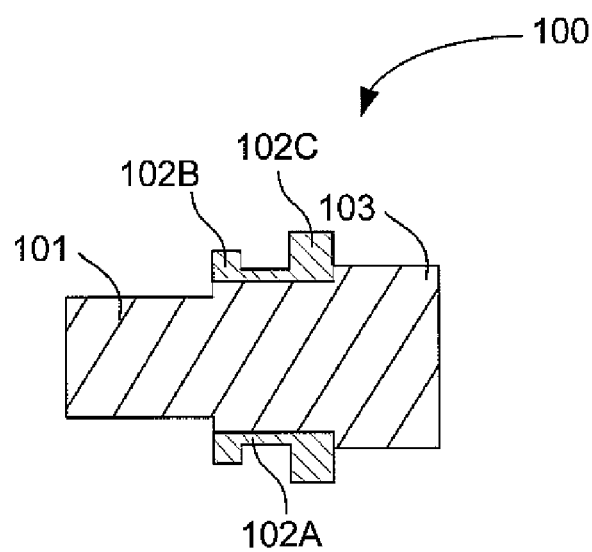

FIGS. 4A and 4B illustrate a side plan view and a cross-sectional side view, respectively, of the receptacle 100 in accordance with one illustrative embodiment. As can be seen from a comparison of FIGS. 2 and FIG. 4A, the shape of the body of the receptacle 100 is identical to the shape of the body of the receptacle 5. Because the shape has not changed, there is no change in the transceiver module assembly process. Like the receptacle 5 shown in FIG. 2, the receptacle 100 shown in FIG. 4A has a first hollow cylindrical portion 101 shaped and sized to receive an optical plug, such as plug 8 shown in FIG. 1. Likewise, the receptacle 100 has a second hollow cylindrical portion 103 shaped and sized to be received in a transmitter or receiver package (not shown), such as transmitter package 16 shown in FIG. 1. The cylindrical portion 103 is typically referred to as a stem, and is received inside of and secured to a cylindrical portion of the transmitter or receiver package.

The receptacle 100 also includes a ring portion defined by a central cylindrical portion 102A and flanges 102B and 102C on either side of the central cylindrical portions. The elements 102A, 102B and 102C have the same shapes and sizes as the elements 26A, 26B and 26C shown in FIG. 2. However, unlike the ring portion of the receptacle 5 shown in FIG. 2, the ring portion of the receptacle 100 shown in FIGS. 4A and 4B is made of an electrically insulating material. The shading of the elements 102A, 102B and 12C in FIG. 4B is intended to indicate that these portions of the receptacle 100 comprise a different material than the material comprising the other portions of the receptacle 100. Consequently, the ring portion is electrically isolative and will be referred to herein as the electrically isolating ring portion of the receptacle 100.

The electrically isolating ring portion may be attached to the metal envelope of the receptacle 100 by, for example, using an adhesive material such as epoxy or by press fitting. The electrically isolating ring portion may be made of any suitable material. One option for this is to use a plastic material marketed under the brand ULTEM™, which is a plastic material that is relatively inexpensive and has desirable characteristics with respect to chemical resistance, dimensional stability, mechanical strength and modulus, and high-temperature performance. In addition, such a material could be provided with an electrically-conductive filler material to provide it with good electromagnetic shielding properties.

Figure 1:
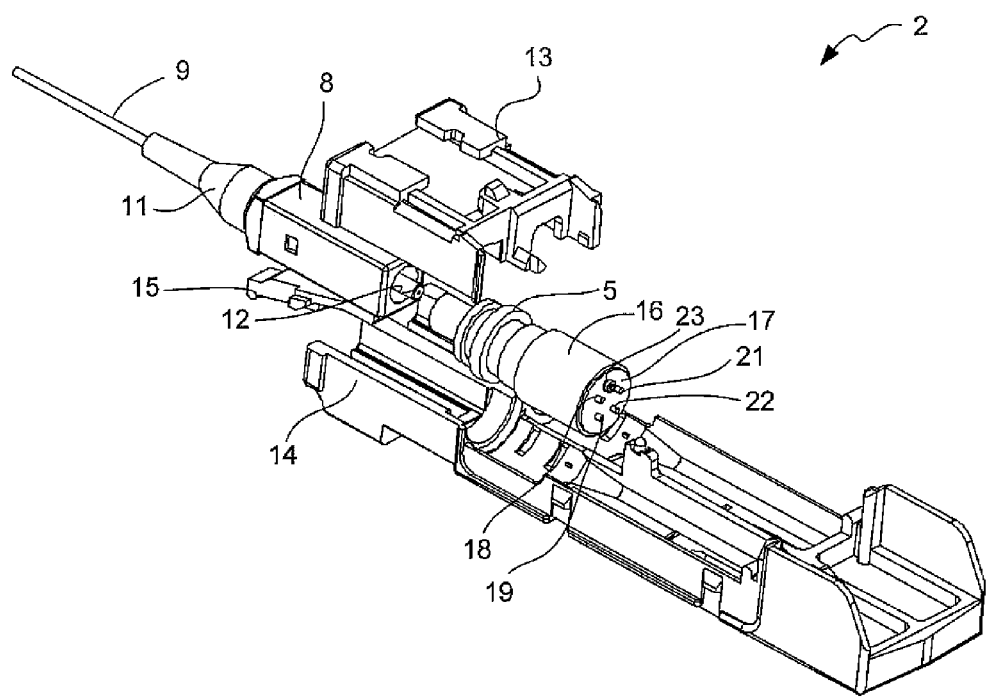
FIG. 1 illustrates a perspective view of a known optical transceiver module 2 that has a format known as a small transceiver format.
Figure 2:
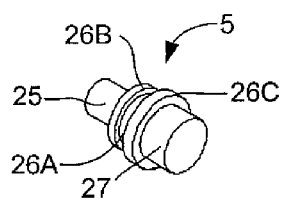
FIG. 2 illustrates a perspective view of the receptacle of the transceiver module shown in FIG. 1.
Figure 5:
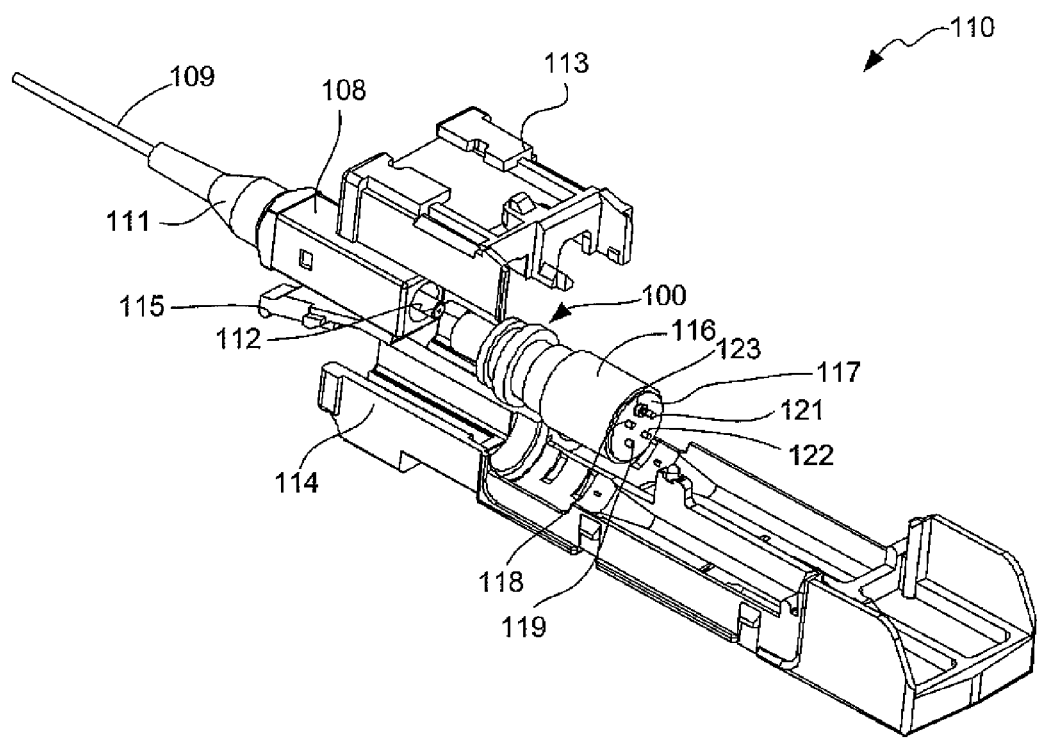
FIG. 5 illustrates a perspective view of a small format transceiver module of the type shown in FIG. 1, but which includes the receptacle shown in FIGS. 4A and 4B.

FIG. 5 illustrates a perspective view of a small format transceiver module 110 of the type shown in FIG. 1, but which includes the receptacle 100 shown in FIGS. 4A and 4B. The elements labeled with reference numbers 108-123 in FIG. 5 may be identical to elements labeled with reference numbers 8-23, respectively, in FIG. 1. However, the receptacle 100 shown in FIG. 5 includes the electrically isolating ring portion described above with reference to FIGS. 4A and 4B. Therefore, when the electrically isolating ring portion of the receptacle 100 is secured to the metallic housing portions 113 and 114, the electrically isolating ring portion will prevent electrical current from passing between the metallic portions 101 and 103 (FIGS. 4A and 4B) of the receptacle 100 and the metallic portions 113 and 114 of the transceiver module housing.

Figure 3:
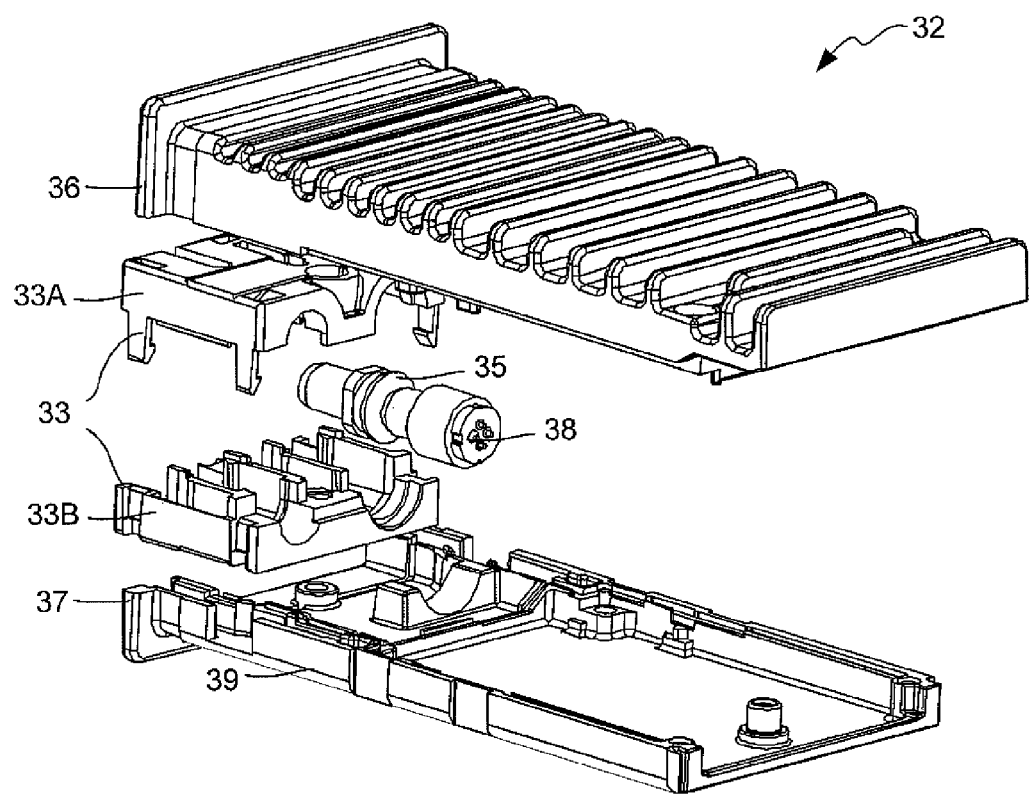
FIG. 3 illustrates a perspective view of a larger format transceiver module having a plastic cage that electrically isolates the receptacle from the upper and lower housing portions.
Figure 6:
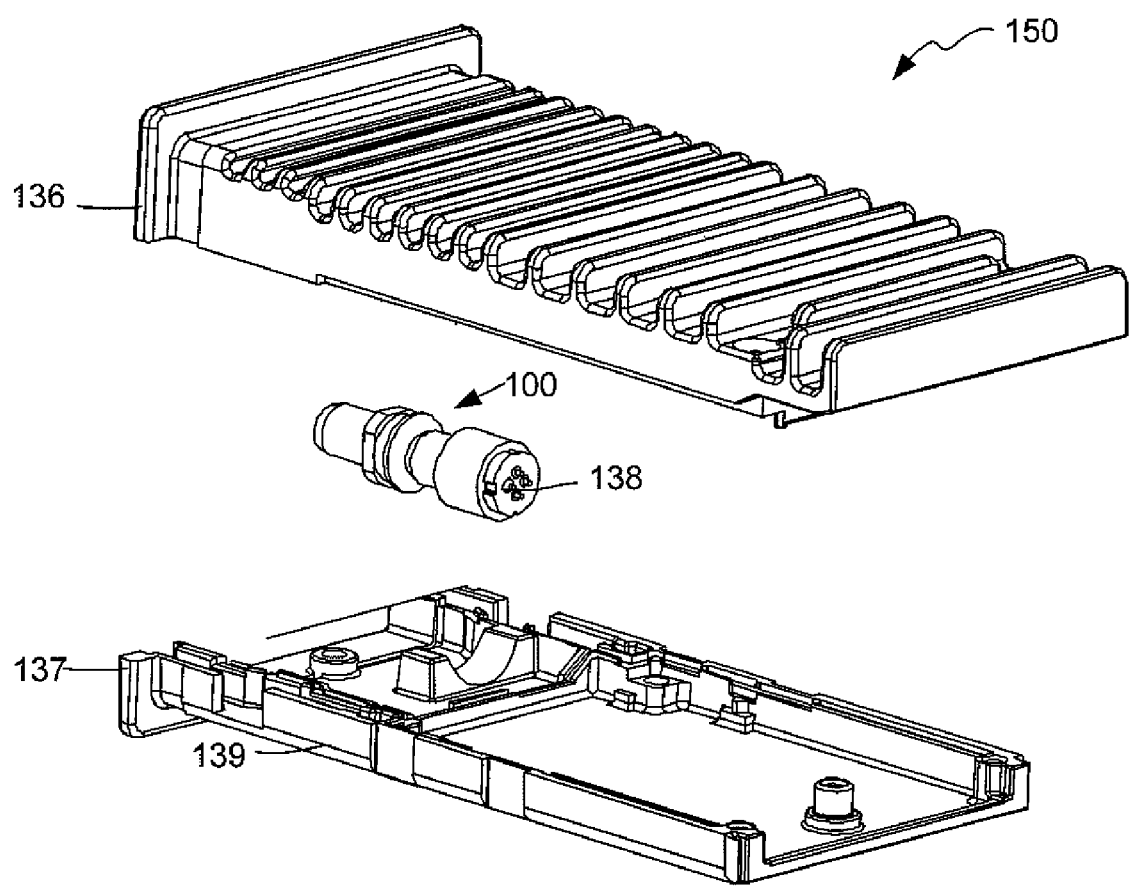
FIG. 6 illustrates a perspective view of a larger format transceiver module of the type shown in FIG. 3, but which includes the receptacle shown in FIGS. 4A and 4B.

FIG. 6 illustrates a perspective view of a larger format transceiver module 150 of the type shown in FIG. 3, but which includes the receptacle 100 shown in FIGS. 4A and 4B. The elements labeled with reference numbers 136-139 in FIG. 6 may be identical to elements labeled with reference numbers 36-39, respectively, in FIG. 3. Because the receptacle 100 shown in FIG. 6 includes the electrically isolating ring portion described above with reference to FIGS. 4A and 4B, the cage 33 is unnecessary and has been eliminated. The electrically isolating ring portion of the receptacle 100 electrically isolates the signal ground 138 from the chassis ground (not shown) attached to the housing portion 136 or 137.

It should be noted that the invention has been described with reference to a few illustrative embodiments and that the invention is not limited to these embodiments. For example, although the receptacle of the invention has been described as having a particular shape and configuration, the receptacle may have any shape or configuration. Also, although the receptacle has been described with reference to its suitability for use in a particular small format transceiver module and in a particular larger format transceiver module, these are merely examples of transceiver modules that can be advantageously equipped with the receptacle of the invention. Those skilled in the art will understand that these and other modifications can be made to the invention and that all such modifications are within the scope of the invention.

What is claimed is:

1. A receptacle for use in an optical transceiver module, the receptacle comprising:
    a first portion adapted to receive an end of an optical plug, the first portion being made of metal;
    a second portion adapted to mechanically couple with a transmitter or receiver package, the second portion being made of metal; and
    a third portion adapted to mechanically couple with a housing of the transceiver module, the third portion comprising an electrically insulating material, wherein the third portion is a ring portion comprising: a cylindrical portion, a first flange and a second flange, the cylindrical portion being disposed between and in contact with the flanges.

2. The receptacle of claim 1, wherein the third portion of the receptacle is made of a plastic material.

3. The receptacle of claim 2, wherein the plastic material is filled with an electrically-conductive filler material to provide the third portion of the receptacle with electromagnetic shielding properties.

4. The receptacle of claim 1, wherein the third portion is secured to the receptacle by an adhesive material.

5. The receptacle of claim 1, wherein the third portion is secured to the receptacle by press fitting the third portion to the receptacle.

6. An optical transceiver module comprising:
    a receptacle comprising:
        a first portion adapted to receive an end of an optical plug, the first portion being made of metal;
        a second portion adapted to mechanically couple with a transmitter or receiver package, the second portion being made of metal; and
        a third portion adapted to mechanically couple with a housing of the transceiver module, the third portion comprising an electrically insulating material, wherein the third portion is a ring portion comprising: a cylindrical portion, a first flange and a second flange, the cylindrical portion being disposed between and in contact with the flanges;
    an optical plug secured to the first portion of the receptacle; and
    a transmitter or receiver package secured to the second portion.

7. The transceiver module of claim 6, wherein the third portion of the receptacle is made of a plastic material.

8. The transceiver module of claim 7, wherein the plastic material is filled with an electrically-conductive filler material to provide the third portion of the receptacle with electromagnetic shielding properties.

9. The transceiver module of claim 6, wherein the third portion is secured to the receptacle by an adhesive material.

10. The transceiver module of claim 6, wherein the third portion is secured to the receptacle by press fitting the third portion to the receptacle.

11. A method for electrically isolating a signal ground from a chassis ground in an optical transceiver module, the method comprising:
    providing a receptacle comprising:
        a first portion adapted to receive an end of an optical plug, the first portion being made of metal;
        a second portion adapted to mechanically couple with a transmitter or receiver package, the second portion being made of metal; and
        a third portion adapted to mechanically couple with a housing of the transceiver module, the third portion comprising an electrically insulating material, wherein the third portion is a ring portion comprising: a cylindrical portion, a first flange and a second flange, the cylindrical portion being disposed between and in contact with the flanges;
    coupling the third portion of the receptacle to a housing of the optical transceiver module;
    securing an optical plug to the first portion of the receptacle; and
    securing a transmitter or receiver package to the second portion of the receptacle.

12. The method of claim 11, wherein the third portion of the receptacle is made of a plastic material.

13. The method of claim 12, wherein the plastic material is filled with an electrically-conductive filler material to provide the third portion of the receptacle with electromagnetic shielding properties.

14. The method of claim 11, wherein the third portion is secured to the receptacle by an adhesive material.

15. The method of claim 11, wherein the third portion is secured to the receptacle by press fitting the third portion to the receptacle.

* * * * *